No. 638,792. Patented Dec. 12, 1899.
T. B. WYLIE.
GAS METER.
(Application filed Mar. 21, 1899.)

(No Model.) 2 Sheets—Sheet 1.

Witnesses
Lindsay B. Little
Walter _____

Inventor
Thomas B. Wylie
By Kay & Totten
Attorneys

No. 638,792. Patented Dec. 12, 1899.
T. B. WYLIE.
GAS METER.
(Application filed Mar. 21, 1899.)

(No Model.) 2 Sheets—Sheet 2.

Witnesses
Lindsay deB. Liscle
Walter Samariss

Inventor
Thomas B. Wylie
By Kay Witter
Attorney

THE NORRIS PETERS CO., PHOTO-LITHO., WASHINGTON, D. C.

UNITED STATES PATENT OFFICE.

THOMAS B. WYLIE, OF ALLEGHENY, PENNSYLVANIA.

GAS-METER.

SPECIFICATION forming part of Letters Patent No. 638,792, dated December 12, 1899.

Application filed March 21, 1899. Serial No. 709,969. (No model.)

*To all whom it may concern:*

Be it known that I, THOMAS B. WYLIE, a resident of Allegheny, in the county of Allegheny and State of Pennsylvania, have invented a new and useful Improvement in Gas-Meters; and I do hereby declare the following to be a full, clear, and exact description thereof.

My invention relates to meters, and more particularly to what are known as "dry" meters.

One of the objects of my invention is to provide a meter of such construction that all the internal parts of same may be put together in working form before they are introduced as a whole into the box or shell of the meter and a working test of the meter may be made without the necessity of inserting the parts into the meter-box to make such test.

A further object of my invention is to simplify the bellows and the manner of operating the registering mechanism thereby.

To these ends my invention comprises, generally stated, a central removable plate having an opening coinciding with the inlet of the meter-box, radial hollow arms extending out from said plate to the bellows-frames connected to said frames and supporting same, a valve carried by said plate controlling the admission and discharge of gas to and from said radial arms, connections between said valve and registering mechanism, and means for operating said valve by the inflation and collapse of the bellows, all the above-described parts being carried by said plate, so that a practical test of the meter may be made before it is inserted in the meter-box and afterward its insertion or withdrawal as a whole be accomplished with equal facility.

My invention further comprises a cylinder carried by the stem, which connects the valve with the registering mechanism, and a series of bellows arranged around said cylinder and acting by their inflation and collapse to impart a rotary movement to said cylinder.

To enable others skilled in the art to make and use my invention, I will describe the same more fully, referring to the accompanying drawings, in which—

Figure 1:
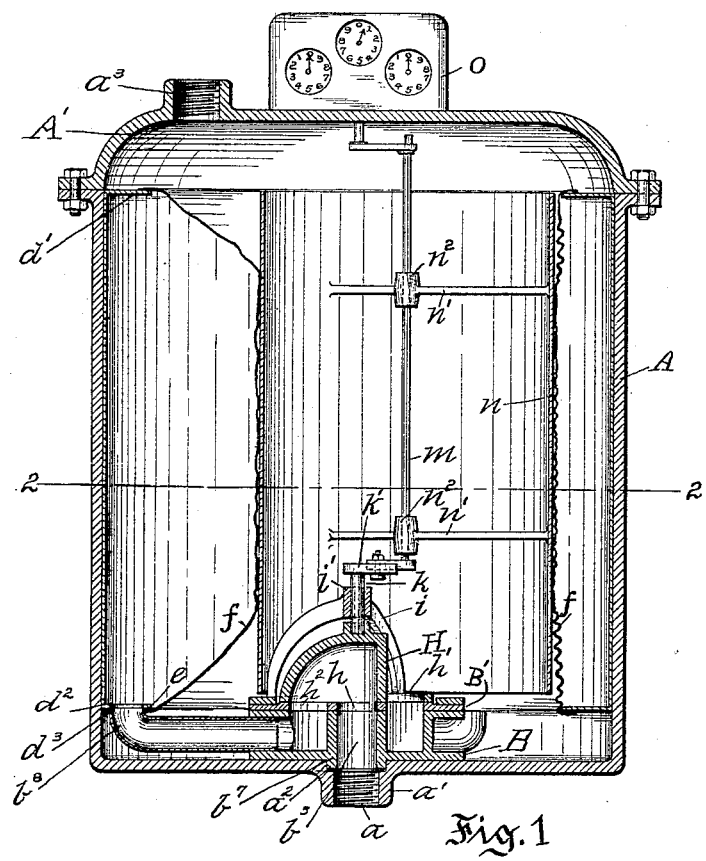
Figure 2:
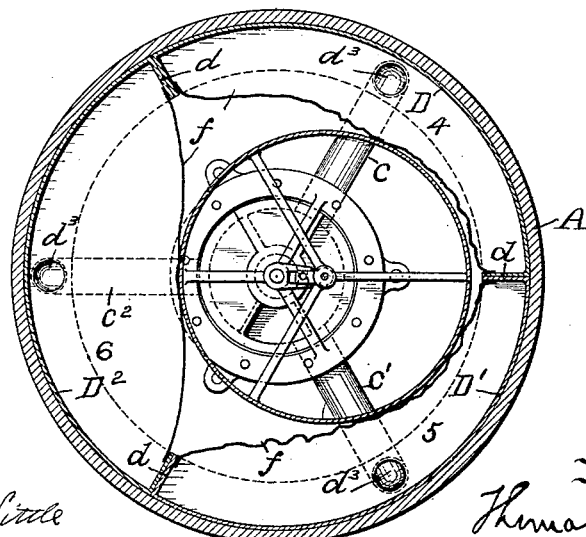
Figure 3:
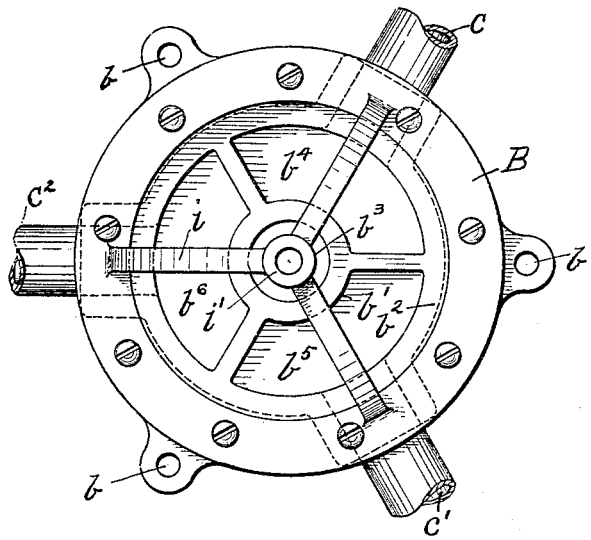
Figure 4:
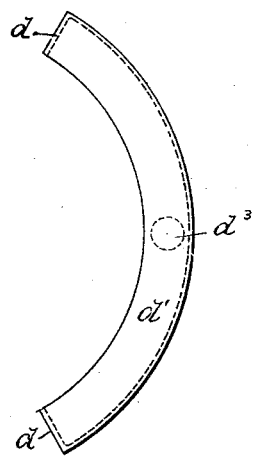
Figure 5:
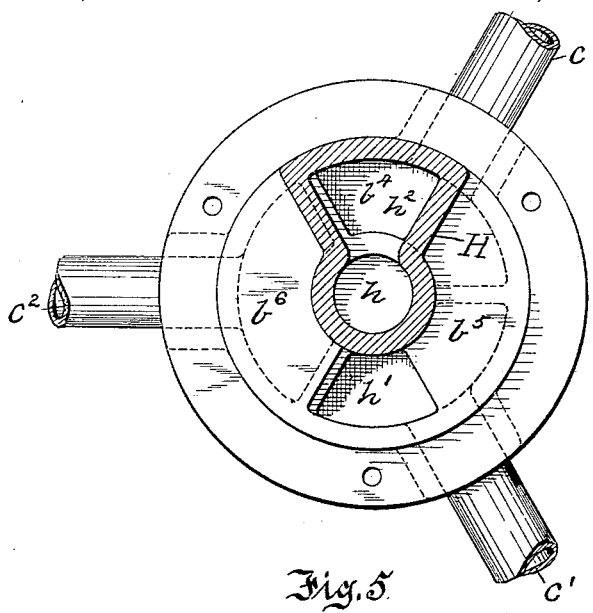

Figure 1 is a sectional elevation of my improved meter. Fig. 2 is a cross-section on the line 2 2, Fig. 1. Fig. 3 is a plan view of the central bottom plate removed. Fig. 4 is a plan view of one of the bottom plates of the bellows-frame. Fig. 5 is a plan view of the central plate and its ports with the valve in section.

Like letters and figures indicate like parts in each view.

The reference-letter A designates a suitable meter box or shell, cylindrical in form, with the central gas-inlet $a$ in its bottom plate. A boss $a'$ surrounds said opening, and within said boss is the seat $a^2$. The top plate A' of the box A has the gas-outlet $a^3$.

Within the box A is the support or plate B, said plate having the apertures $b$, through which screws or other fastening devices pass to secure said plate to the bottom of said box. The plate B has the concentric rings $b'$ $b^2$, which form the central opening $b^3$, coinciding with the opening $a$, and the annular space between said rings which is divided up into the ports $b^4$ $b^5$ $b^6$. A collar $b^7$ on the plate B fits into the seat $a^2$ in the boss $a'$ of the box. Radial arms $c$ $c'$ $c^2$ extend out from the plate B, said arms having passages therein which connect the ports $b^4$ $b^5$ $b^6$ with the bellows-pockets 4, 5, and 6, respectively. The bellows-frames D D' D² are carried by the radial arms $c$ $c'$ $c^2$, respectively, of the plate B. These bellows-frames are curvilinear in form, so as to conform to the inner walls of the cylindrical box A, and have the inwardly-extending longitudinal flanges $d$ and the horizontal flanges $d'$ and $d^2$ at the top and bottom thereof, respectively. The bottom flanges $d^2$ have the orifices $d^3$, with which the upwardly-extending outer ends $b^8$ of the radial arms $c$ $c'$ $c^2$ are adapted to engage. A ferrule $e$ on the end of the arm engages with the threads formed in the orifice $d^3$. The flexible material $f$, such as leather, is secured to the flanges $d$, $d'$, and $d^2$ of the bellows-frames, so as to form said bellows-pockets 4, 5, and 6, sufficient of the flexible material being employed to permit of the said pockets being inflated to the proper degree to operate the cylinder, hereinafter referred to.

Resting on the valve-seat B', supported by the central plate B, is the valve H, which is one of the ordinary forms of valves used in connection with dry meters of this same general type. This valve H has the central chamber $h$ and adjacent to its circumference the port $h'$ to correspond with the ports $b^4$ $b^5$ $b^6$ of the plate B. When the valve is in position, the central chamber $h$ coincides with the openings $b^3$ and $a$ of the plate B and box A, respectively. The valve H has the port $h^2$, leading from the chamber $h$ and by means of which said chamber is brought into communication with the ports $b^4$ $b^5$ $b^6$, so that gas entering said chamber may pass through the ports $h^2$, &c., to the passages in the radial arms $c$ $c'$ $c^2$. Inclosing the valve H is the cage $i$, which is secured to the plate B. A stem $k$ on said valve H passes up through a guide $i'$ in the cage $i$. A crank $k'$ on the stem $k$ is secured on the lower end of the central rod $m$. A cylinder $n$ has the spiders $n'$ therein, with guides $n^2$, through which the rod $m$ passes, said rod being secured to said guides.

The upper end of the rod $m$ is connected to the registering mechanism $o$, which may be of any ordinary construction and does not need further description, as it forms no part of my invention.

It is evident from the above description that all the operative parts of the meter may be put together before they are inserted in the box—that is, all the parts are built upon and secured to the support or plate B preparatory to inserting in the box. By this construction it is possible to make a test of the meter when the parts have been assembled without placing them in the box. This is a matter of great convenience, as the parts are all exposed and ready access may be had to them in case it is necessary to correct any errors developed by the test. After the test the assembled parts are lowered into the box and when the plate B has been secured to the bottom of the box and the top of the box secured in place the meter is complete. With the same ease by freeing the support or plate the entire contents of the meter can be removed as one piece, so that for purposes of repair this construction has great advantages.

When in use, the gas enters the opening $a$ of the box and passes therefrom to the valve H, whence it passes through the port $h^2$ to the ports $b^4$ $b^5$ $b^6$. The port $h^2$, as shown in Fig. 5, is about to communicate with two of the ports $b^4$ $b^6$, so that two of the bellows-pockets will be taking in gas at the same time, while the port $h'$ of said valve is in communication with the port $b^5$, which is carrying the gas discharged from one of the pockets back into the meter to escape by the outlet $a^3$. As the bellows are inflated successively the pressure created thereby is exerted against the outer walls of the eccentrically-mounted cylinder and causes said cylinder to rotate. In this manner the valve is moved to admit and discharge the gas to and from the bellows-pockets in succession and at the same time the register is operated to indicate the quantity of gas passing through the meter.

By the use of the cylinder no connections between the valve-operating mechanism and the bellows are required. The entire inner or belly portion of the bellows may be composed of one piece of flexible material connected to the framework of the bellows, so that there is not so much opportunity for leakage and the construction is greatly simplified.

What I claim as my invention is—

1. In a meter the combination with a suitable box, or shell, of a removable plate having ports therein, a valve controlling said ports, said plate having passages extending out therefrom communicating with said ports, bellows carried by said plate, and with which said passages communicate, and means for moving said valve by the inflation and collapse of said bellows.

2. In a meter, the combination with a suitable box, of a removable plate having ports therein, a valve controlling said ports, said plates having arms extending out therefrom with passages formed therein communicating with said ports, bellows carried by said arms and with which said passages communicate, and means for moving said valve by the inflation and collapse of said bellows.

3. In a meter, the combination with a suitable box, of a removable plate having concentric rings forming a central opening and an annular opening divided into two or more ports, a valve resting on said rings and controlling said opening and ports, radial arms extending out from said plate with passages formed therein communicating with said ports, bellows carried by said arms and with which said passages communicate, and means for moving said valve by the inflation and collapse of said bellows.

4. In a meter, the combination with a suitable box, of a removable plate having ports therein, a valve controlling said ports, arms extending out from said plate with passages formed therein communicating with said ports, bellows-frames, said arms being connected to the bottom plates of said bellows-frames, and means for moving said valve by the inflation and collapse of the bellows.

5. In a meter, the combination with a suitable box, of a valve, bellows, said valve controlling ports leading to and from said bellows, a cylinder rotated by the inflation and collapse of said bellows, and connections between said cylinder and said valve and the registering mechanism.

6. In a meter, the combination with a suitable box, of a valve, bellows, the belly portion of said bellows being formed of flexible material, a cylinder rotated by the inflation and collapse of said bellows, and connections between said cylinder and said valve and the registering mechanism.

7. In a meter, the combination with a suitable box, of a valve, bellows, an eccentrically-supported cylinder rotated by the inflation and collapse of said bellows, and connections between said cylinder and said valve and the registering mechanism.

8. In a meter, the combination with a suitable box, of a valve, a crank on said valve, bellows, a rod connected to said crank and to the registering mechanism, and a cylinder mounted on said rod rotated by the inflation and collapse of said bellows.

In testimony whereof I, the said THOMAS B. WYLIE, have hereunto set my hand.

THOMAS B. WYLIE.

Witnesses:
 ROBT. D. TOTTEN,
 ROBERT C. TOTTEN.